(12) United States Patent
Kratz

(10) Patent No.: US 6,966,680 B2
(45) Date of Patent: Nov. 22, 2005

(54) DECORATIVE LIGHTING DISPLAY WITH CHANGEABLE SHADES AND BULBS

(76) Inventor: Edward Kratz, 163 Forest Rd., Mountain Top, PA (US) 18707

( * ) Notice: Subject to any disclaimer, the term of this patent is extended or adjusted under 35 U.S.C. 154(b) by 74 days.

(21) Appl. No.: 10/723,069

(22) Filed: Nov. 28, 2003

(65) Prior Publication Data

US 2005/0117338 A1   Jun. 2, 2005

(51) Int. Cl.[7] .................. F21S 13/10; F21V 21/002
(52) U.S. Cl. .............. 362/431; 362/249; 362/368; 362/439; 362/649; 362/655
(58) Field of Search ............................. 362/431, 238, 362/226, 368, 249, 439, 640, 649, 653, 655

(56) References Cited

U.S. PATENT DOCUMENTS

| | | | |
|---|---|---|---|
| 4,870,548 A | 9/1989 | Beachy et al. | |
| 4,996,636 A * | 2/1991 | Lovett | 362/431 |
| 5,149,188 A * | 9/1992 | Robbins | 362/183 |
| 5,274,537 A * | 12/1993 | Altman | 362/353 |
| 5,586,742 A | 12/1996 | Carter | |
| 5,954,426 A | 9/1999 | Whittington | |
| 6,000,820 A | 12/1999 | Murray | |
| D418,935 S | 1/2000 | Gilbert et al. | |
| 2004/0032727 A1 * | 2/2004 | Cok | 362/84 |

* cited by examiner

*Primary Examiner*—Alan Cariaso
*Assistant Examiner*—Mark Tsidulko

(57) ABSTRACT

An outdoor decorative lighting arrangement and system includes a plurality of lighting fixtures with each fixture including a stake, a bulb and shade assembly, and a coupling assembly for connecting the bulb and shade assembly to the stake. The shades are detachable and interchangeable on the lighting fixtures and come in a variety of forms or shapes that are representative of different holiday occasions and events. The decorative lighting system can be used with an existing permanent outdoor lighting system, and can operate off of 110 volt AC current, 12 volt DC current, or through solar panels incorporated with one or more of the light shades.

1 Claim, 4 Drawing Sheets

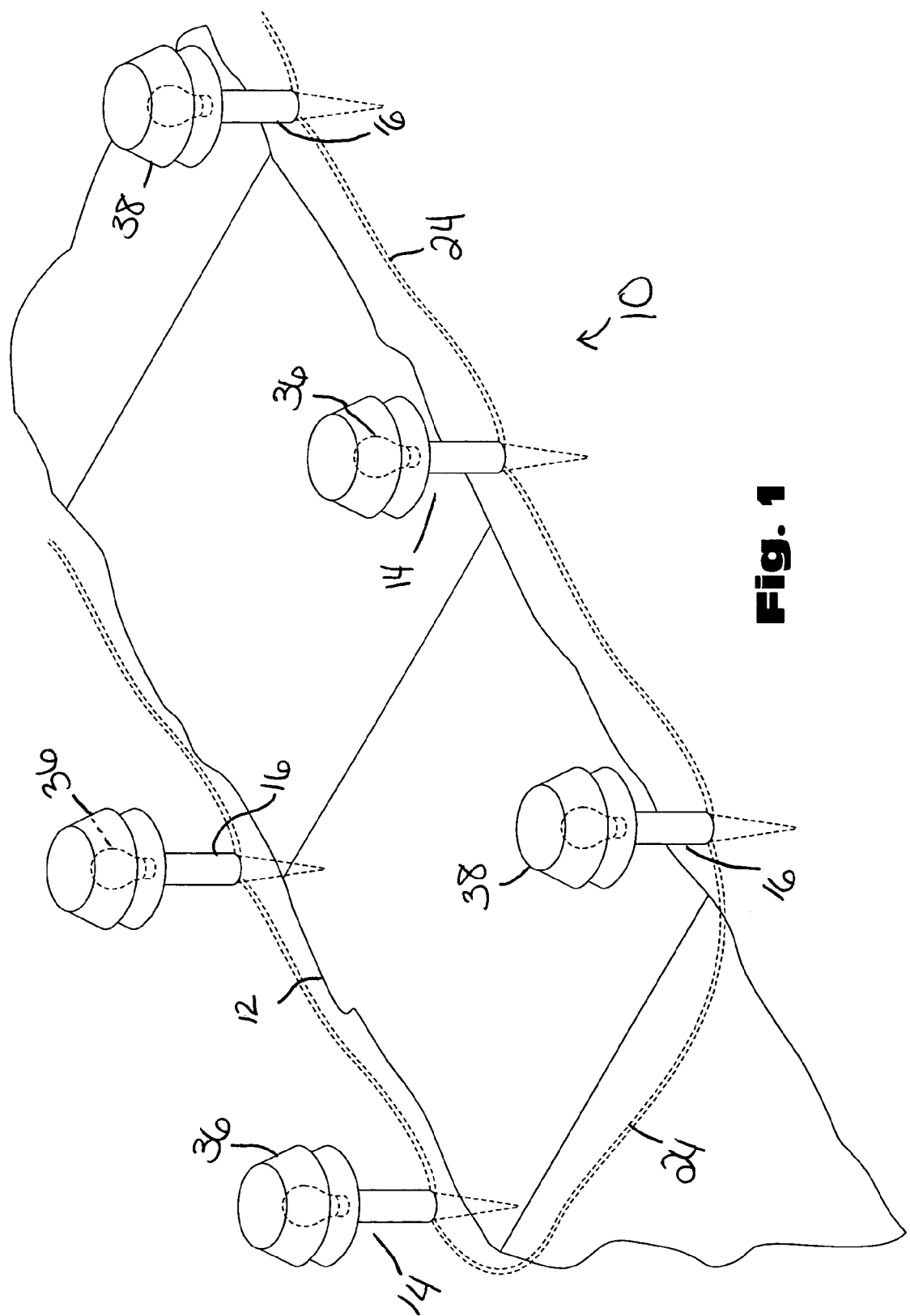

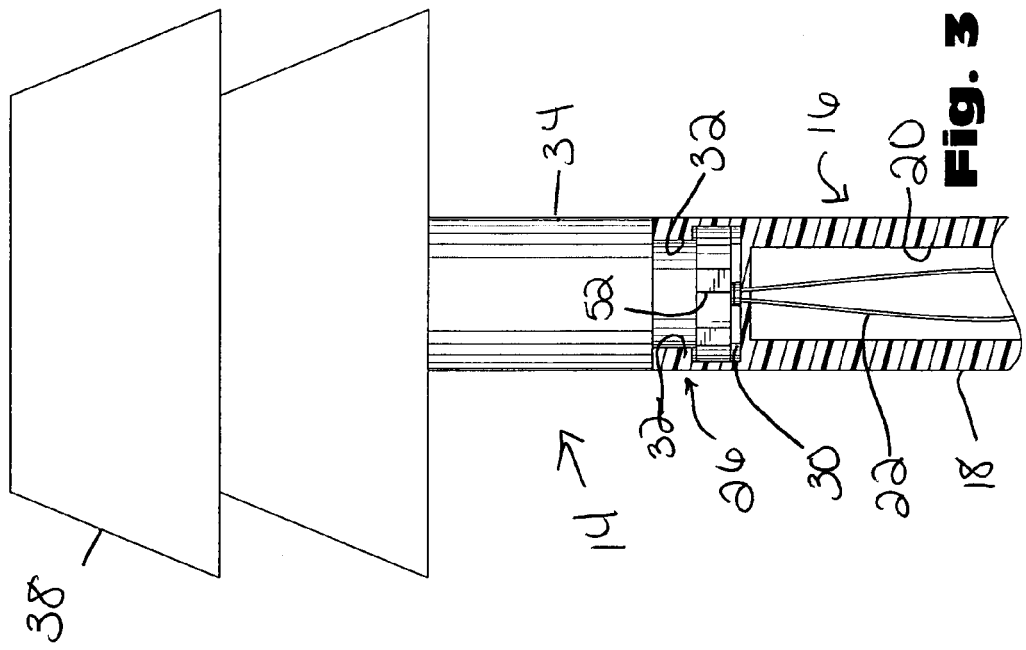
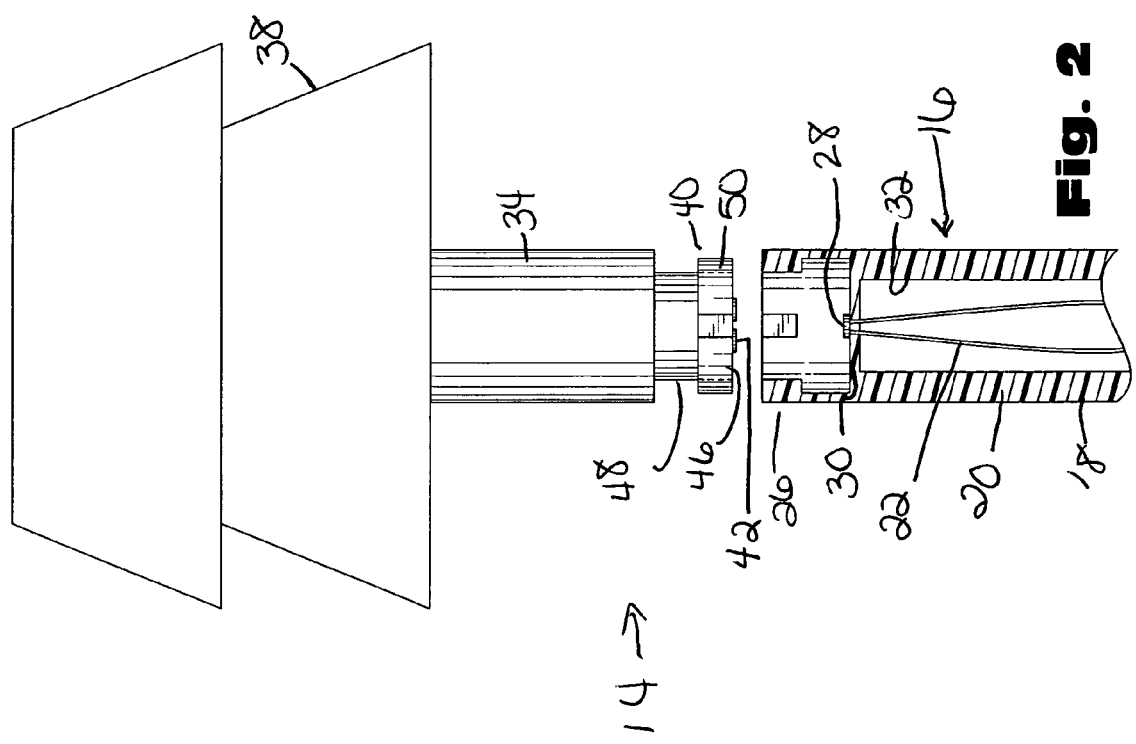

DECORATIVE LIGHTING DISPLAY WITH CHANGEABLE SHADES AND BULBS

FIELD OF THE INVENTION

The present invention pertains to decorative outdoor lighting arrangements, and more particularly pertains to an outdoor lighting system that includes changeable decorative shades and bulbs.

BACKGROUND OF THE INVENTION

In order to enhance the appearance of residential and commercial properties, decorative lighting arrangements are commonly used to outline and illuminate the walkways, flower gardens, sidewalks and driveways of the properties. The lighting arrangements are generally of low intensity and the various types of lights or bulbs comprising the arrangement are mounted upon stakes that are fixed into the ground at regularly spaced intervals for outlining and illuminating the walkways, sidewalks, and driveways. Thus, the lighting arrangement has a practical aspect in that it is easier and safer to traverse illuminated walkways, sidewalks, and driveways at night, especially for young children and the elderly. In addition, the shades or covers for the bulbs can come in various shapes and forms that correspond or relate to particular events or holidays such as Halloween, Thanksgiving Day, Hanukkah, President's Day, the Fourth of July, Christmas, etc. The shades or covers can be detachable so that one only needs to change the shades to correspond to the particular occasion while leaving the rest of the lighting arrangement infixed in the ground. The stakes or posts can be of various materials such as wood, plastic, copper or brass, and do not generally require the use of tools for insertion into the ground. In many cases such decorative lighting arrangements are permanently infixed in the ground and are thus considered fixtures of the dwelling.

Because of their widespread use as both practical safety additions for a dwelling and their ability to aesthetically enhance a residence or commercial establishment, the prior art discloses a number of designs and arrangements for decorative lighting systems.

For example, the Altman patent (U.S. Pat. No. 5,274,537) discloses a decorative component in the form of a cover that can be substituted for standard commercial illuminated markers.

The Carter patent (U.S. Pat. No. 5,586,742) discloses a light standard that includes a flange for securement to the ground, a post, and a plastic cap for covering the top of the post.

The Whittington patent (U.S. Pat. No. 5,954,426) discloses an interchangeable lamp that includes several tubes of different lengths, each of which is securable to a base for varying the vertical location of the light source.

The Murray patent (U.S. Pat. No. 6,000,820) discloses a low voltage light novelty decoration that includes a novelty decoration that is interconnected to a light fixture by a continuous ring and a cone-shaped top cap.

The Gilbert et al. design patent (U.S. design Pat. No. 418,935) discloses a landscape light in the shape of a novelty pumpkin head attached to a stake having a lower pointed end that is driven into the ground.

Among the disadvantages to previous inventions is the cost and continuous maintenance involved with a previously installed outdoor lighting system. Many homeowners neither have and desire a permanent low intensity lighting system. In addition, these devices require both the disassembly and removal of the existing light covers or they require the assembly of covers over each existing light fixture and then their removal at the end of that particular display period. Therefore, what is desired is a simple, inexpensive and complete decorative lighting system that can be used by any homeowner with the minimum of tools and technical expertise. Such a system could be used either as a stand alone, temporary decorative lighting system, or the system could be used in conjunction with existing lighting systems through the use of regular adapters.

SUMMARY OF THE INVENTION

The present invention comprehends a decorative lighting arrangement that in one embodiment can be used with an existing low-intensity outdoor lighting system. The decorative lighting arrangement includes translucent decorative shades or covers for replacing the shades or covers of the existing low intensity outdoor lighting system.

In a second embodiment the present invention comprehends an outdoor decorative lighting arrangement including a plurality of light fixtures with each light fixture including a stake, a light bulb assembly wherein the bulb and the shade are a one-piece unit, and the shade is of a translucent decorative design. The shade is attachable to the stake by a coupler having a four tab configuration. The lighting fixtures are wired together in series by a common electric wire supplying low voltage 110 volt AC current from a standard electric wall outlet. In addition, the decorative lighting arrangement can operate off of 12 volt DC current through a transformer.

It is an objective of the present invention to provide an outdoor decorative lighting arrangement that provides for changeable decorative shades that represent or signify various holiday events, occasions or seasons.

It is another objective of the present invention to provide a decorative lighting arrangement that can be incorporated with an existing outdoor decorative lighting system.

Still another objective of the present invention is to provide a decorative lighting arrangement that can be easily and quickly set up with a minimum of tools and technical expertise.

Yet another objective of the present invention is to provide an outdoor lighting arrangement wherein the shades and bulbs are integral one piece units that allow for the quick and easy interchange on the lighting fixtures.

Still yet another objective of the decorative lighting arrangement of the present invention is to provide for the incorporation of solar panels with the shades as a power source.

Yet a further objective of the present invention is to provide a decorative lighting arrangement wherein the coupling mechanism between the stakes and the shade and bulb assembly is watertight to prevent corrosion and short circuiting of the entire lighting arrangement.

These and other objects, features and advantages will become apparent to one skilled in the art upon a perusal of the following detailed description read in conjunction with the accompanying drawings and the appended claims.

BRIEF DESCRIPTION OF THE DRAWINGS

FIG. 1 is a perspective view of the decorative lighting arrangement of the present invention illustrating the disposition of the light fixtures adjacent a sidewalk with standard shades;

FIG. 2 is a side elevational view of the decorative lighting arrangement of the present invention illustrating the alignment prior to attachment of a shade and bulb unit with the upper end of the lighting fixture stake;

FIG. 3 is a side elevational view of the decorative lighting arrangement of the present invention illustrating the coupling of the shade and bulb assembly to the upper end of the lighting fixture stake for making the electrical connection therewith;

DETAILED DESCRIPTION OF THE PREFERRED EMBODIMENT

Figure 4:
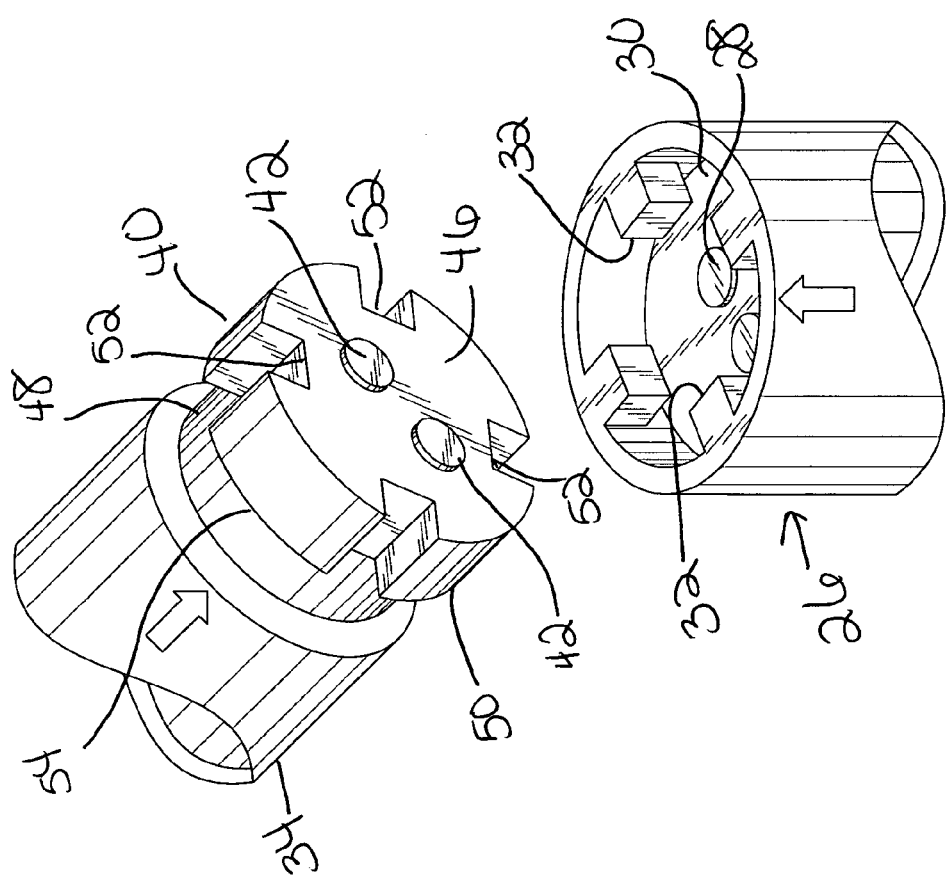
FIG. 4 is a perspective view of the decorative lighting arrangement of the present invention illustrating the four tab configuration that facilitates the connection of the shade and bulb assembly to the upper end of the lighting fixture stake.

Illustrated in FIGS. 1–5 are the various embodiments for a permanent and portable outdoor lighting arrangement and system of the present invention. In one embodiment a standard low intensity outdoor lighting system 10 is illustrated in FIGS. 1–3. The lighting system 10 is spaced on either side of a walkway 12 for illuminating the walkway 12 at dusk and at night, and includes a plurality of lighting fixtures 14 that include stakes or posts 16 insertable into the ground in spaced relation to each other. The stakes 16 define an outer side wall 18 (generally either cylindrical or square-shaped), and the outer side wall 18 further defines a hollow interior 20 for accommodating electrical conductors 22. The entire lighting system 10 is linked in series by a primary conductor or wiring 24 that generally plugs into an outdoor wall socket or outlet for providing power to the lighting system 10. The primary conductor 24 can thus tie into a 60 hertz, 110 volt AC power source or a 12 volt DC power source. Since the lighting system 10 shown in FIGS. 1–3 generally represents a permanent installation, the primary conductor 24 that electrically connects the lighting fixtures 14 is buried in the ground for protection.

Figure 5:
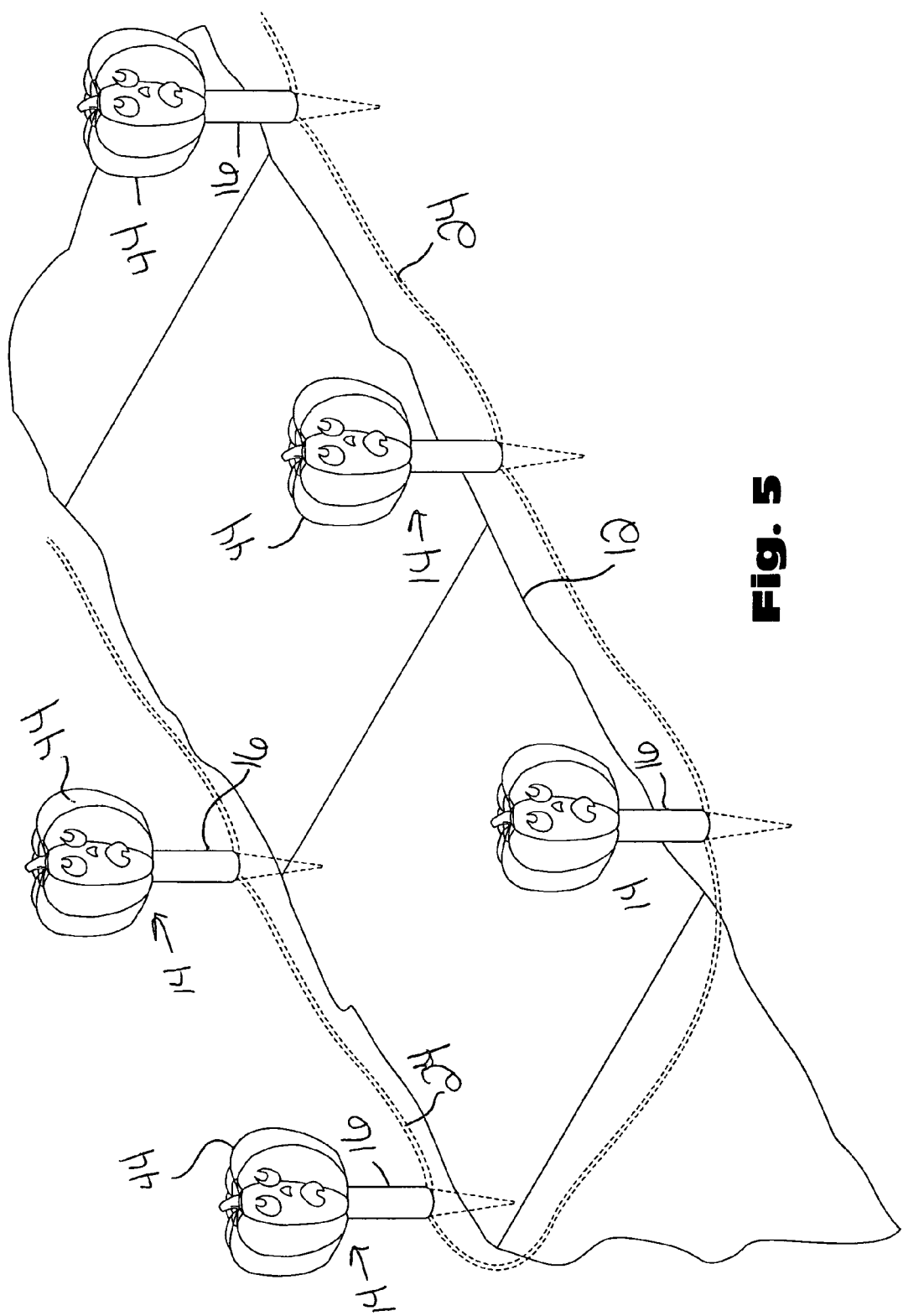
FIG. 5 is a perspective view of the decorative lighting arrangement of the present invention illustrating the use of shades having the form of decorative Halloween pumpkins.

As shown in FIGS. 1–3, the stakes 16 include a cylindrical upper end 26 whereupon the interior electrical conductors 22 terminate at contacts 28 located within the recess 30 defined by the upper end 26 of each stake 16. At the upper end 26 is a coupling assembly that includes inwardly extending protrusions 32. The coupling assembly of FIGS. 2 and 3 includes four protrusions 32 that are spaced from each other at 90 degrees. The coupling assembly interconnects to a decorative shade and bulb assembly that includes a stem 34, a bulb 36 and a shade or cover 38. The base 40 of the stem 34 is shaped to interlock with the coupling assembly and includes bulb contacts 42 for making the electrical connection with the contacts 28 located within the recess 30 at the upper end 26 of each stake 16 so that the bulbs 36 can be energized. The coupling assembly interlocks to the base 40 of the stem 34 in a watertight manner for preventing corrosion and the short circuiting of the electrical conducting elements. In addition, the shades or covers 38 shown in FIGS. 1–3 are detachable from the stems 34 on which the bulbs 36 are mounted. Furthermore, as shown in FIG. 5, the shades 38 can be detachable from the lighting fixtures 14 themselves, and can be in the form or shape of any conceivable festive or holiday event, occasion or season, including but not limited to, Halloween, Easter, Christmas, Hannukah, Kwanza, the Fourth of July, Thanksgiving, President's day, etc. The decorative shades 44 of FIG. 5 are in the form of pumpkins for representing Halloween. It should be noted that the decorative shades 44 and the bulbs 36 of the outdoor lighting system of FIG. 5 can be a one piece unit or assembly for allowing the quick and easy attachment, detachment and interchanging of the decorative shades 44 for corresponding to the respective holiday occasion or event.

FIG. 4 illustrates the base 40 of the stem 34 wherein the base 40 further includes a flat underside 46 that is brought into engagement with the recess 30 at the upper end 26 of the respective stake 18. The bulb contacts 42 touch the contacts 28 within the recess 30 for making the electrical connection. In addition, the base 40 of the stem 34 is further defined by a neck 48 and an enlarged circular head 50 having four spaced-apart slots or grooves 52 that are shaped to receive and allow passage therethrough by the protrusions 32. The grooves 52 are spaced from each other by semi-circular ledges 54. Thus, each slot 52 on the circular-shaped head 50 at the base 40 of the stem 34 functions similar to a mortise and each protrusion 32 of the coupling assembly functions similar to a tenon. The slots 52 receive the protrusions 32 and allow the protrusions 32 to pass therethrough so that the protrusions 32 can be positioned adjacent the neck 48 of the stem 34. Then rotation of the stem 34 positions the protrusions 34 against and beneath the ledges 54 thereby locking the bulb and shade unit to the stake 16. A ¼ quarter will lock and unlock the bulb and shade unit to the coupling assembly at the upper end 26 of the stake 16. In addition, the bulb 36 and shade 44 of FIG. 5 can be a one piece unit wherein the shade 44 is interconnected to the bulb 16 for facilitating their interchange on different lighting fixtures and outdoor lighting systems.

Another embodiment of the present invention includes a complete portable outdoor decorative lighting system that incorporates elements and features of the lighting systems illustrated in FIGS. 1–5. The decorative light covers or shades can be any desirable figure, such as the shades 44 of FIG. 5, corresponding to any holiday or a special occasion such as a birthday. The portable outdoor lighting system would include a plurality of lighting fixtures, such as fixtures 14, comprising circular stakes removably insertable into the ground and spaced from each other a suitable distance. The bulb assembly would be a one-piece unit wherein the bulb and shade are interconnected, and the decorative light shade would be securable to the outside rim of the upper surface of the stake by means of, for example, clips. The lighting for each of the fixtures would be provided by a low wattage replaceable bulb. The decorative lighting fixtures would be tied together in series by electric wiring, and one end of the electric wiring would have a standard plug for plugging into an outdoor electric socket.

It should be noted that solar panels could be incorporated into the shades or covers 36 or 44 shown in FIGS. 1–5 whereby the shades 36 and 44 of each lighting fixture 14 would include a solar panel, or the solar panel could be placed on the shade 36 or 44 of the lighting fixture 14 positioned to receive the most overall exposure to sunlight. This solar panel—incorporated or placed on or forming a part of the shade of just one lighting fixture—would act as a collector or transformer for delivering power to the bulbs on all the other lighting fixtures.

The foregoing is considered as illustrative of several embodiments of the invention, and since numerous alterations, modifications, and variations will occur to those skilled in the art, it is not desired to limit the invention to the exact construction and operation shown and described, and, accordingly, all suitable modifications, alterations, and variations may be resorted to, falling within the scope of the invention.

I claim:

1. A decorative outdoor lighting system, comprising:
   a plurality of lighting fixtures for insertion into the ground at regularly spaced intervals from each other;
   each lighting fixture including a stake having a lower end for insertion into the ground, an opposed upper end, and a hollow interior;
   each stake further including a coupling assembly located at the upper end and the coupling assembly including at least four inwardly extending protrusions;
   a bulb and shade assembly for removable securement to the coupling assembly of the stake, the bulb and shade assembly including a stem, a bulb mounted to the stem, and a shade;
   the stem including a circular head having four slots spaced at 90 degrees from each other and which are slidably mateable with the protrusions of the coupling assembly at the upper end of the stake for interconnecting the bulb and shade assembly to the upper end of the stake;
   the stem capable of being rotated in quarter turns for locking and unlocking the bulb and shade assembly to the stake so that the bulb and shade assembly is interchangeable on the stakes for suiting a particular holiday occasion and event;
   the bulb and shade assembly being interconnected so that the bulb and shade assembly can be mounted and removed as a unit to the coupling assembly of the stake;
   the shade of the bulb and shade assembly being interchangeable on the stem and each shade having a shape representative of a holiday occasion, event or season; and
   a power source for the lighting system including a plurality of low voltage solar panels mounted to each shade of the bulb and shade assembly for supplying power to each respective bulb.

* * * * *